US011184169B1

(12) United States Patent
Sokolov et al.

(10) Patent No.: US 11,184,169 B1
(45) Date of Patent: Nov. 23, 2021

(54) SYSTEMS AND METHODS FOR CROWD-STORING ENCRYPIION KEYS

(71) Applicant: Symantec Corporation, Mountain View, CA (US)

(72) Inventors: Ilya Sokolov, Boston, MA (US); Lei Gu, Bedford, MA (US); Daniel Kats, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 323 days.

(21) Appl. No.: 16/231,887

(22) Filed: Dec. 24, 2018

(51) Int. Cl.
*H04L 9/08* (2006.01)
*H04L 9/14* (2006.01)

(52) U.S. Cl.
CPC ............ *H04L 9/0894* (2013.01); *H04L 9/085* (2013.01); *H04L 9/0861* (2013.01); *H04L 9/14* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 8,520,855 B1* | 8/2013 | Kohno | ................... | G06F 21/602 380/277 |
| 8,538,029 B2* | 9/2013 | Li | .......................... | H04L 9/085 380/279 |
| 9,374,221 B1* | 6/2016 | Juels | ...................... | H04L 9/3215 |
| 9,667,416 B1* | 5/2017 | Machani | ................. | H04L 63/06 |
| 9,892,460 B1* | 2/2018 | Winklevoss | ........... | G06Q 40/04 |
| 10,735,193 B1* | 8/2020 | Knas | ..................... | H04L 9/0861 |
| 2009/0119518 A1* | 5/2009 | Staddon | .............. | G06F 21/6227 713/193 |
| 2010/0054481 A1* | 3/2010 | Jajodia | .................. | H04L 9/0897 380/284 |
| 2016/0212109 A1* | 7/2016 | Hird | ....................... | H04L 63/062 |
| 2016/0337124 A1* | 11/2016 | Rozman | ................. | H04L 9/085 |
| 2019/0007205 A1* | 1/2019 | Corduan | .............. | G06Q 20/367 |
| 2019/0238323 A1* | 8/2019 | Bunch | .................. | H04L 9/0877 |
| 2019/0245688 A1* | 8/2019 | Patin | ..................... | H04L 9/0637 |

(Continued)

OTHER PUBLICATIONS

"Secret Sharing", URL: https://en.wikipedia.org/wiki/Secret_sharing, Jan. 2019, 7 pages.

(Continued)

*Primary Examiner* — Eleni A Shiferaw
*Assistant Examiner* — Bassam A Noaman
(74) *Attorney, Agent, or Firm* — FisherBroyles, LLP

(57) ABSTRACT

The disclosed computer-implemented method for crowd-storing encryption keys may include (i) sending, from a client computing device and to a server, a recovery request, (ii) creating a first public-private key pair, (iii) receiving a plurality of encrypted shares of an encryption key from the server in response to the recovery request, where the encrypted shares are encrypted with a first public key of the first public-private key pair, and (iv) performing a security action including (A) decrypting the plurality of encrypted shares of the encryption key with a first private key of the first public-private key pair and (B) recovering the encryption key from the decrypted plurality of shares of the encryption key. Various other methods, systems, and computer-readable media are also disclosed.

19 Claims, 6 Drawing Sheets

(56) References Cited

U.S. PATENT DOCUMENTS

2019/0342084 A1* 11/2019 Mehedy ................ H04L 9/0825

OTHER PUBLICATIONS

Douglas, Theo, "Iowa, Five Other States Will Try Digital Driver's License Projects in 2018", URL: http://www.govtech.com/transportation/Iowa-Five-Other-States-Will-Try-Digital-Drivers-License-Projects-in-2018.html, Oct. 20, 2017, 11 pages.

Bigham et al., "Crowd Storage: Storing Information on Existing Memories", URL: web.eecs.umich.edu/~wlasecki/pubs/storage.pdf, Apr. 26-May 1, 2014, 4 Pages, CHI 2014, Toronto, Ontario, Canada.

* cited by examiner

SYSTEMS AND METHODS FOR CROWD-STORING ENCRYPTION KEYS

BACKGROUND

Storing digital information in cloud-based storage devices is becoming more and more prevalent as users want to safeguard sensitive digital information such as images, video, financial data, passwords, etc. To safeguard digital information, users may encrypt the digital information prior to sending the digital information to the cloud-based storage devices. Encrypting the digital information may entail generating public-private key pairs that include private keys that users securely store. Unfortunately, sometimes users lose the private keys and/or passwords to use the private keys, which may prevent the users from decrypting the digital information stored in the cloud-based storage devices. As a result, in some cases, the digital information may be forever encrypted and thus hopelessly lost. The instant disclosure, therefore, identifies and addresses a need for systems and methods for crowd-storing encryption keys.

SUMMARY

As will be described in greater detail below, the instant disclosure describes various systems and methods for crowd-storing encryption keys. In some examples, the term "encryption keys," as used herein may refer to encryption keys and/or decryption keys. In some examples, the term "encryption keys," as used herein may refer to symmetric decryption keys.

In one example, a method for crowd-storing encryption keys may include (i) sending, from a client computing device and to a server, a recovery request, (ii) creating a first public-private key pair, (iii) receiving a plurality of encrypted shares of an encryption key from the server in response to the recovery request, where the encrypted shares are encrypted with a first public key of the first public-private key pair, and/or (iv) performing a security action including (A) decrypting the plurality of encrypted shares of the encryption key with a first private key of the first public-private key pair and/or (B) recovering the encryption key from the decrypted plurality of shares of the encryption key.

In some examples, the method may include generating, at the client computing device, a keychain having authentication credentials. In some embodiments, the method may further include sending the keychain to the server for storage at the server. In an example, the method may include deriving, at the client computing device, the first public-private key pair from the authentication credentials. In an embodiment, the method may include storing the recovered encryption key on a keychain at the client computing device.

In some examples, the method may include (i) receiving, at a crowd worker computing device, an encrypted share of the encryption key, (ii) decrypting, at the crowd worker computing device, the encrypted share of the encryption key with a crowd worker private key, (iii) re-encrypting, at the crowd worker computing device, the decrypted shares of the encryption key with the first public key of the first public-private key pair, and/or (iv) sending, from the crowd worker computing device to the server, the re-encrypted shares of the encryption key.

In some embodiments, the method may include (i) causing, in response to receiving the recovery request, the server to wait until "k" crowd worker computing devices are logged-in, where "k" may be a total number of different shares into which the encryption key may be divided and/or (ii) causing the server to send, after "k" crowd worker computing devices are logged-in, the plurality of encrypted shares of the encryption key from the server to the client computing device.

In an example, the method may include (i) creating, at the client computing device, a second keychain, (ii) creating a second public-private key pair including a second public key, (iii) locking the second keychain with the second public-private key pair, (iv) receiving public keys of crowd worker computing devices for at least "n" crowd worker computing devices, (v) dividing the encryption key into the plurality of shares, where there are "n" shares in the plurality of shares, (vi) encrypting the plurality of shares of the encryption key with the public keys of crowd worker computing devices, and/or (vii) sending the plurality of encrypted shares of the encryption key to the server.

In an embodiment, the method may include (i) receiving, at the server, the plurality of encrypted shares of the encryption key and/or (ii) storing, on a digital information storage device at the server, the plurality of encrypted shares of the encryption key and identifiers of crowd worker computing devices associated with each share of the plurality of encrypted shares of the encryption key.

In some examples, the method may include selecting the "n" crowd worker computing devices based on crowd worker computing device authentication profiles. In some embodiments, the authentication profiles comprise per-crowd worker computing device factors including at least one of (i) a frequency of credential reset on the crowd worker computing device, (ii) a number of credentials stored on the crowd worker computing device, (iii) an identity of specific credentials stored on the crowd worker computing device, (iv) a frequency of a user logging-in to the crowd worker computing device, (v) a number of security-related applications installed on the crowd worker computing device, (vi) a rate of a user logging-in by the crowd worker computing device, and/or (vii) a quantity of sensitive information stored on the crowd worker computing device.

In an example, the method may include storing the first private key of the first public-private key pair and the second private key of the second public-private key pair on digital information storage devices in a manner such that the server may be unable to access the first private key of the first public-private key pair and the second private key of the second public-private key pair.

In an embodiment, the method may include transferring, via the server and between the client computing device and the crowd worker computing devices, the first public key of the first public-private key pair, the second public key of the second public-private key pair, and the public keys of crowd worker computing devices.

In some examples, the method may include receiving, from a graphical user interface depicted on a display device, input indicating a user request to send, from the client computing device and to the server, the recovery request.

In one embodiment, a system for crowd-storing encryption keys may include at least one physical processor and physical memory that includes computer-executable instructions that, when executed by the physical processor, cause the physical processor to (i) send, from a client computing device and to a server, a recovery request, (ii) create a first public-private key pair, (iii) receive a plurality of encrypted shares of an encryption key from the server in response to the recovery request, where the encrypted shares are encrypted with a first public key of the first public-private key pair, and/or (iv) perform a security action including (A)

decrypting the plurality of encrypted shares of the encryption key with a first private key of the first public-private key pair and/or (B) recovering the encryption key from the decrypted plurality of shares of the encryption key.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) send, from a client computing device and to a server, a recovery request, (ii) create a first public-private key pair, (iii) receive a plurality of encrypted shares of an encryption key from the server in response to the recovery request, where the encrypted shares are encrypted with a first public key of the first public-private key pair, and/or (iv) perform a security action including (A) decrypting the plurality of encrypted shares of the encryption key with a first private key of the first public-private key pair and/or (B) recovering the encryption key from the decrypted plurality of shares of the encryption key.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
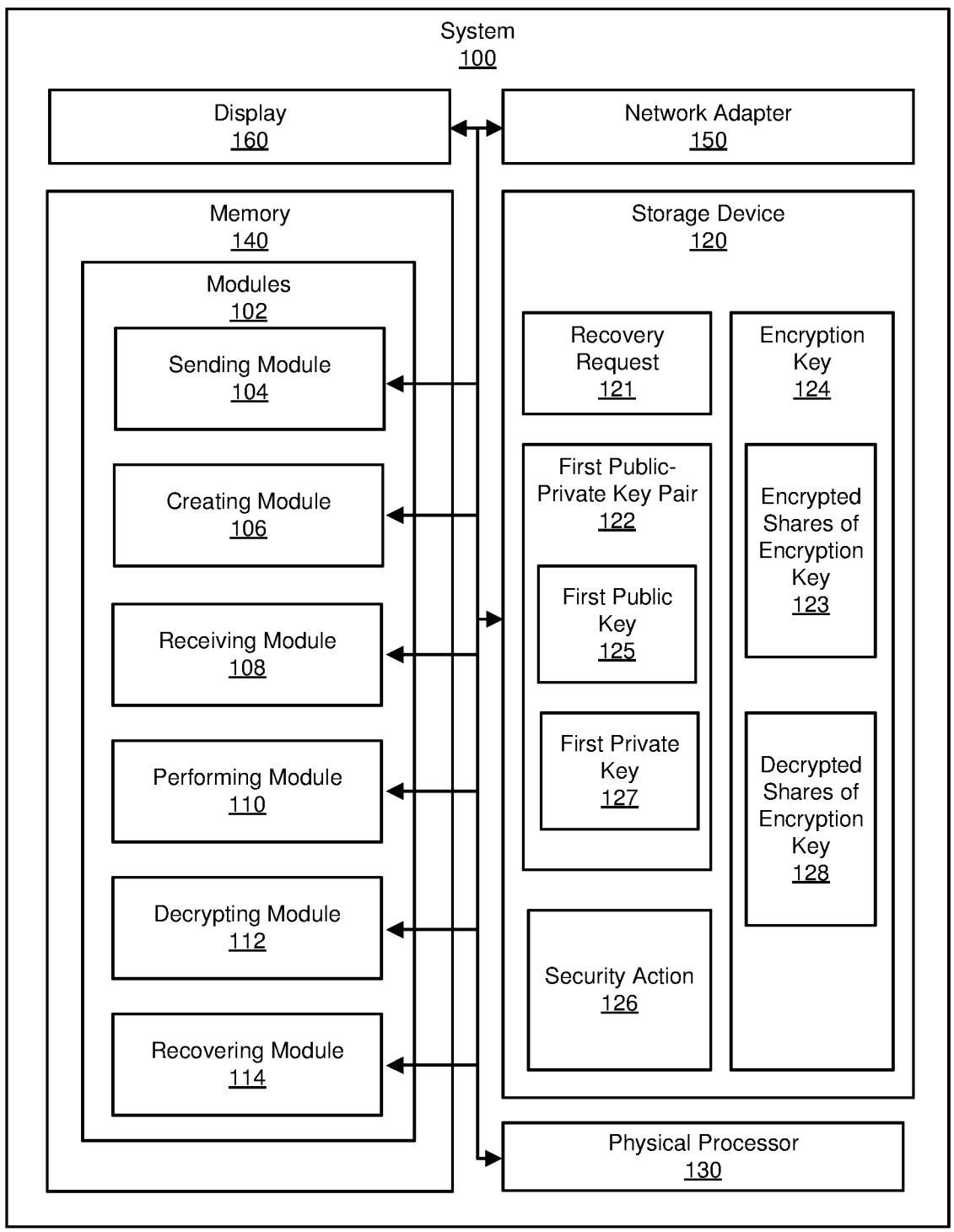
FIG. 1 is a block diagram of an example system for crowd-storing encryption keys.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for crowd-storing encryption keys. In some examples, provided are techniques for crowd-storing encryption keys based on authentication credentials and authentication profiles of crowd worker computing devices such that losing private keys and/or passwords to use the private keys will not result in stored information being forever encrypted. Further, in some examples, the provided techniques do not expose keys to cloud storage providers.

In some examples, when cloud storage may be initially set-up, crowd worker computing devices may be selected. Further, users may encrypt digital information with encryption keys (e.g., symmetric decryption keys) and may store the encrypted digital information on servers such as cloud-based storage devices. Client computing devices may perform a "secret sharing scheme" cryptography technique to divide the encryption keys into many different shares. The client computing devices may encrypt the shares with public keys of public-private key pairs of the crowd worker computing devices. Individual shares may be copied multiple times, with each copy being encrypted with a different public key from public-private key pairs of the crowd worker computing devices. The number of shares may be less than the number of crowd worker computing devices calculated to be available for subsequent key recovery. The encrypted shares may be stored on servers such as cloud-based storage devices. The servers then store the encrypted shares and identities of the associated crowd worker computing devices. Then, in some embodiments, users of the client computing devices may lose access to their encryption keys (e.g., by forgetting passwords) and need to perform key recovery.

In some examples, key recovery may include sending recovery requests from client computing devices to servers. Client computing devices may generate keychains having authentication credentials. In some embodiments, the client computing devices may send the keychains to the servers for storage at the servers. The client computing devices may derive a new public-private key pair from the authentication credentials, thus creating new public-private key pairs including new public keys and new private keys.

Servers may receive the recovery requests and cause, in response to receiving the recovery request, the server to wait until "k" crowd worker computing devices are logged-in, where "k" may be a total number of different shares into which the encryption key may be divided. After "k" crowd worker computing devices are logged-in, the servers may send the plurality of encrypted shares of the encryption key from the server to the "k" crowd worker computing devices.

Crowd worker computing devices (i) receive respective encrypted shares (i.e., chunks) of the encryption keys, (ii) decrypt the respective encrypted shares of the encryption keys with crowd worker private keys, (iii) re-encrypt the decrypted shares of the encryption key with the new public key of the new public-private key pair created by the client computing devices, and/or (iv) send, to the servers, the re-encrypted shares of the encryption key.

Client computing devices may (i) receive a plurality of encrypted shares of the encryption keys from the server in response to the recovery request, where the encrypted shares may be encrypted with the new public key of the new public-private key pair, (ii) decrypt the plurality of encrypted shares of the encryption key with the new private key of the new public-private key pair, (iii) recover the encryption keys from the decrypted plurality of shares of the encryption keys and/or (iv) store the recovered encryption keys on keychains at the client computing devices. In some examples, client computing devices may then retrieve encrypted digital information (e.g., stored on cloud-based storage devices and/or other digital information storage devices) and decrypt the encrypted digital information with the encryption keys.

By doing so, the systems and methods described herein may improve the security of computing devices and/or provide targeted protection against lost encryption keys, malware that affects (e.g., alters and/or deletes) encryption keys, and/or malicious users. In some examples, the systems and methods described herein may advantageously help users recover lost encryption keys. As such, the provided techniques may advantageously protect users by beneficially reducing security risks posed by lost encryption keys, malicious processes, and/or malicious users.

Figure 2:
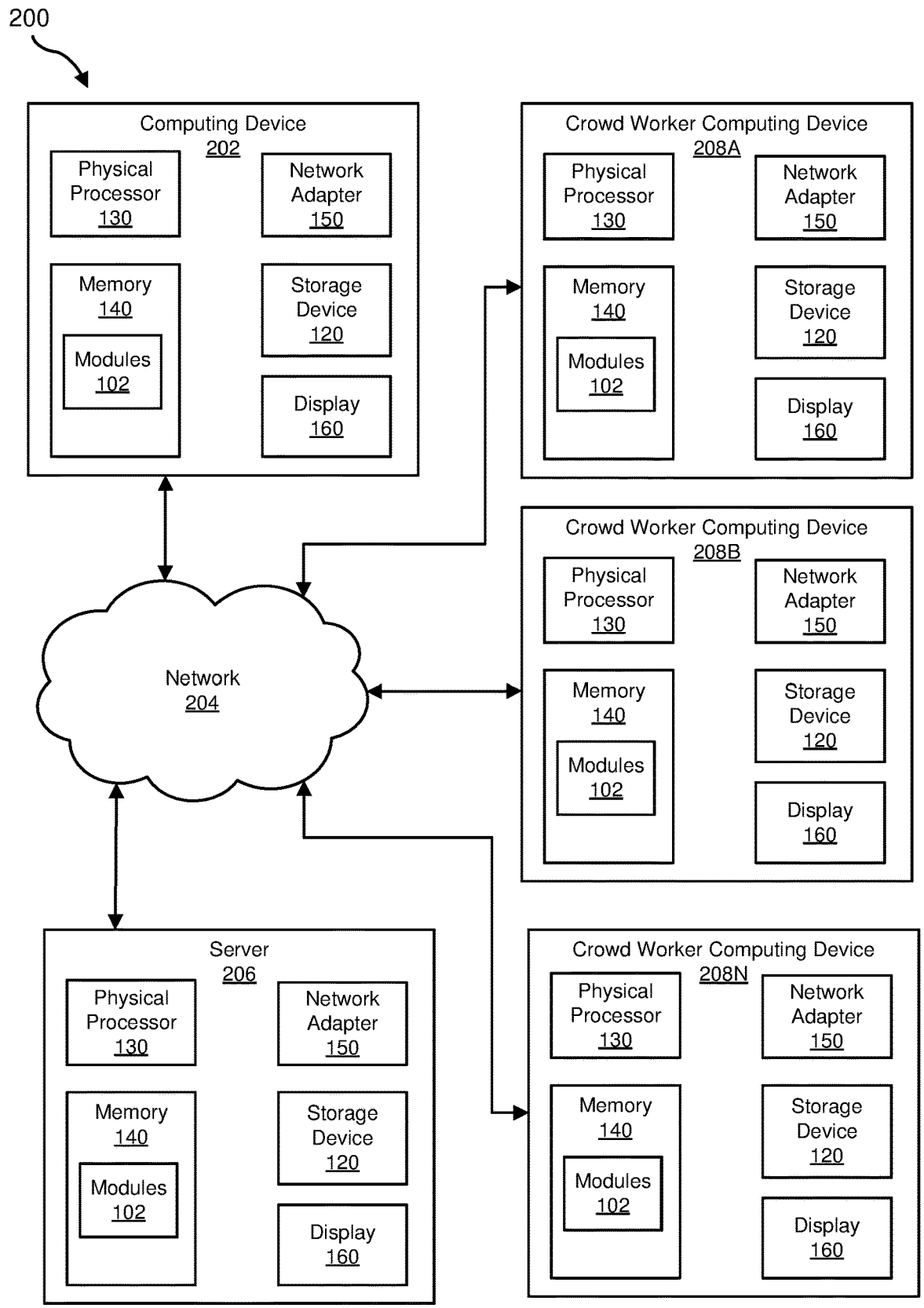
FIG. 2 is a block diagram of an additional example system for crowd-storing encryption keys.
Figure 3:
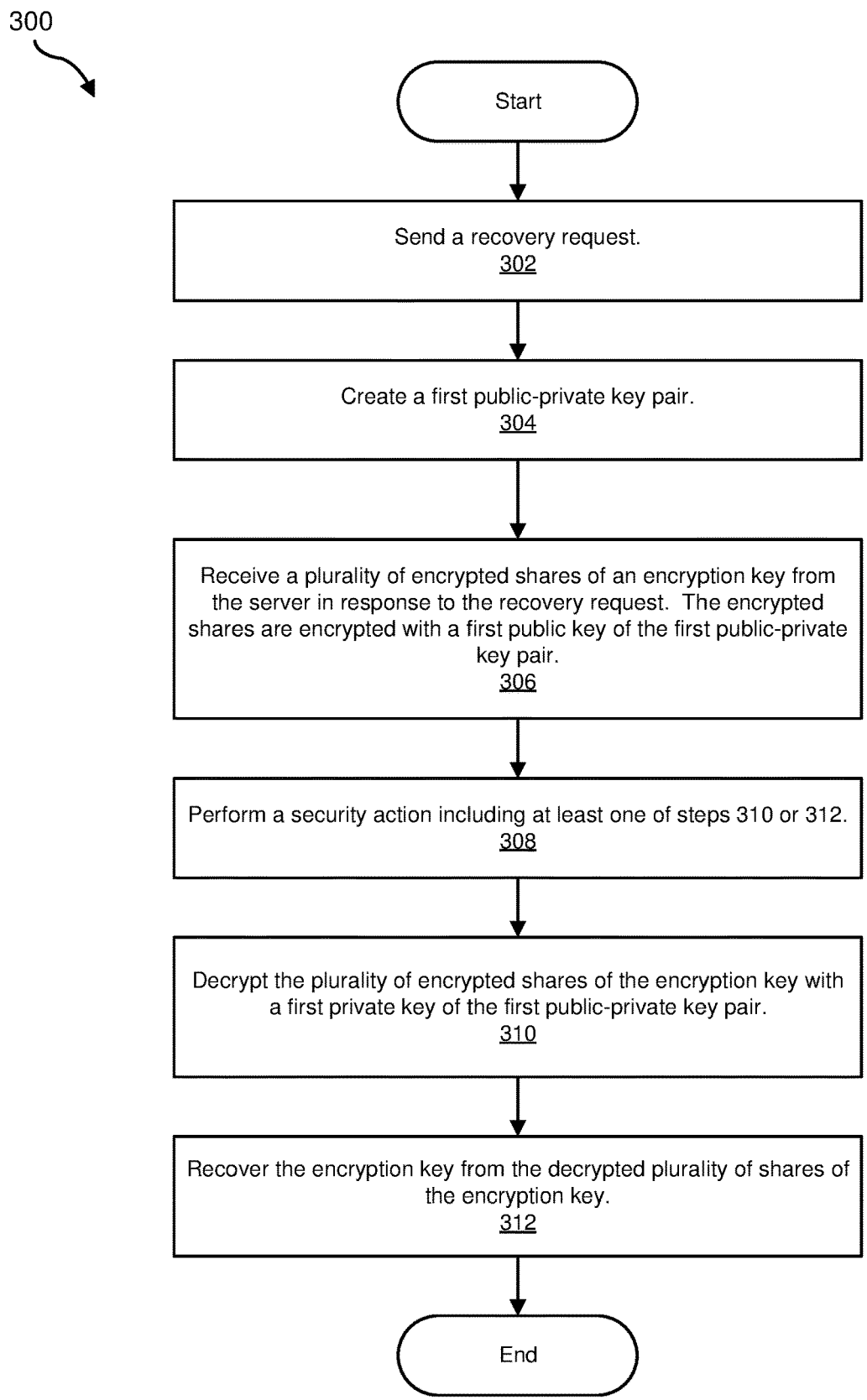
FIG. 3 is a flow diagram of an example method for crowd-storing encryption keys.
Figure 4:
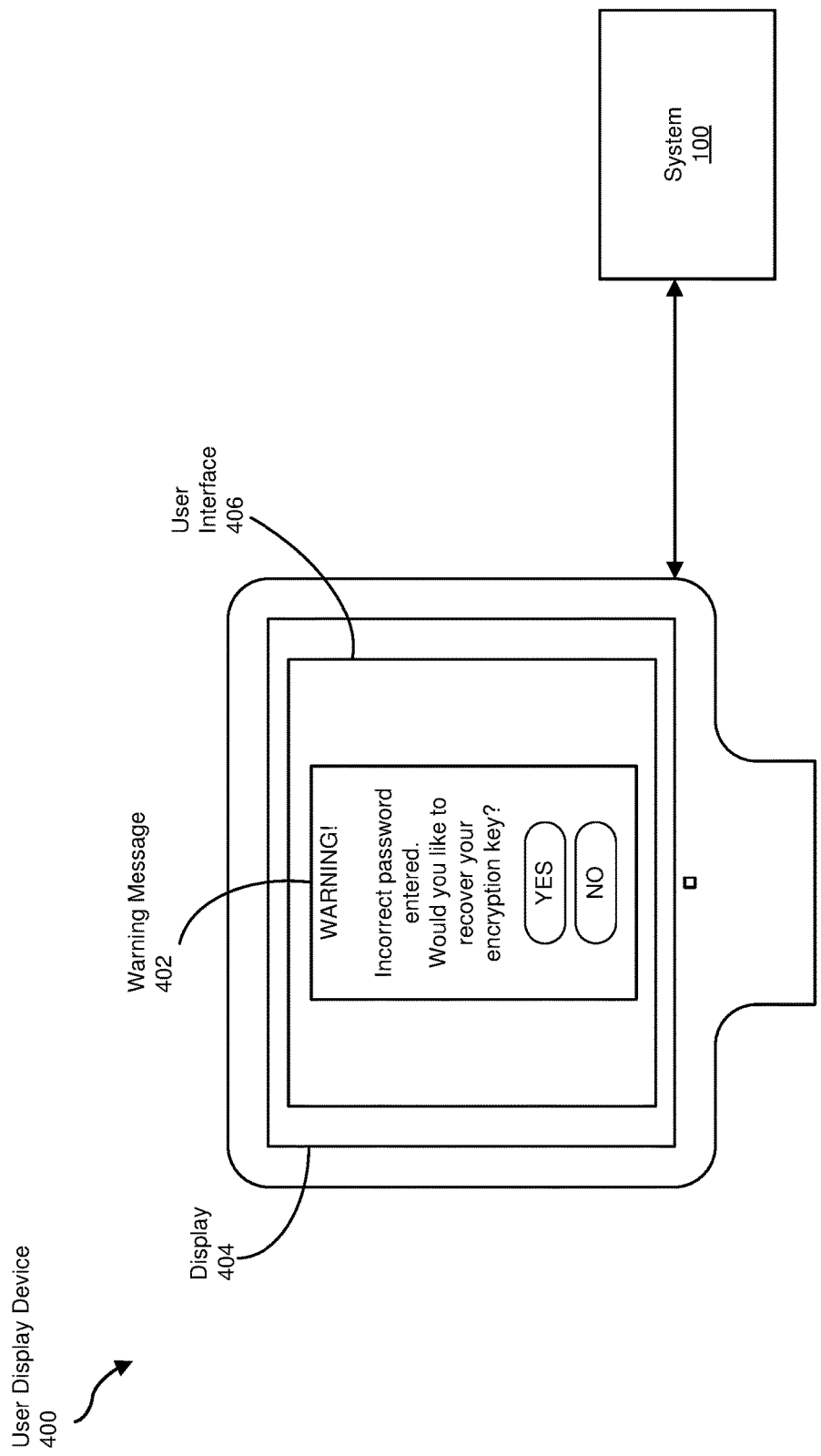
FIG. 4 is a block diagram of an example warning message on a user display device.

The following will provide, with reference to FIGS. 1-2 and 4, detailed descriptions of example systems for crowd-storing encryption keys. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for crowd-storing encryption keys. As illustrated in this figure, example system 100 may include one or more modules 102 for performing one or more tasks. As will be explained in greater detail below, modules 102 may include a sending module 104, a creating module 106, a receiving module 108, a performing module 110, a decrypting module 112, and/or a recovering module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or crowd worker computing devices 208A-208N). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of a recovery request 121, a first public-private key pair 122, encrypted shares of encryption key 123, an encryption key 124, a first public key 125, a security action 126, a first private key 127, and/or decrypted shares of the encryption key 128. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate crowd-storing encryption keys. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface (e.g., to enable user interaction with system 100). In non-limiting examples, display 160 may present at least a portion of recovery request 121, first public-private key pair 122, encrypted shares of encryption key 123, encryption key 124, first public key 125, security action 126, first private key 127, and/or decrypted shares of the encryption key 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and/or crowd worker computing devices 208A-208N via a network 204. In one example, all or a portion of the functions of modules 102 may be performed by computing device 202, server 206, crowd worker computing devices 208A-208N and/or any other suitable computing system. As will be described in greater detail below, one or more of modules 102 from FIG. 1 may, when executed by at least one processor of computing device 202, server 206, and/or crowd worker computing devices 208A-208N, enable computing device 202, server 206, and/or crowd worker computing devices 208A-208N to crowd-store encryption keys. For example, and as will be described in greater detail below, one or more of modules 102 may cause at least a portion of computing device 202, server 206, and/or crowd worker computing devices 208A-208N to (i) send, from computing device 202 and to server 206, recovery request 121, (ii) create first public-private key pair 122, (iii) receive a plurality of encrypted shares of an encryption key 123 from server 206 in response to recovery request 121, where the encrypted shares of the encryption key 123 may be encrypted with first public key 125 of first public-private key pair 122, and/or (iv) perform security action 126 including (A) decrypting the plurality of encrypted shares of the encryption key 123 with first private key 127 of first public-private key pair 122 and/or (B) recovering encryption key 124 from the decrypted plurality of shares of the encryption key 128.

Computing device 202 generally represents any type or form of computing device capable of reading computer-executable instructions. In some examples, computing device 202 may represent a computer running security software, such as anti-malware software and/or encryption software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running security software, such as anti-malware software and/or encryption software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Crowd worker computing devices 208A-208N generally represent any type or form of computing devices capable of reading computer-executable instructions. In some examples, crowd worker computing devices 208A-208N may represent computers running security software, such as anti-malware software and/or encryption software. Additional examples of crowd worker computing devices 208A-208N may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

FIG. 3 is a flow diagram of an example computer-implemented method 300 for crowd-storing encryption keys. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

In some examples, steps 302-312 may relate to recovery of lost encryption keys. Following step 312 below are descriptions of example methods to create the subsequently lost (or otherwise unavailable) keys and/or disseminate encrypted shares of the keys.

As illustrated in FIG. 3, at step 302 one or more of the systems described herein may send (e.g., from client computing devices and to servers) recovery requests. The systems described herein may perform step 302 in a variety of ways. For example, sending module 104 may, as part of computing device 202, server 206, and/or at least one of crowd worker computing devices 208A-208N in FIG. 2, send, from computing device 202 and to server 206, recovery request 121. We turn now to FIG. 4.

FIG. 4 depicts an example of a user display device 400 including a display 404 (e.g., display 160) which may present a user interface 406 (e.g., a graphical user interface). In this non-limiting example, user display device 400 may display a warning message 402 as at least a part of security action 126 in response to identifying encryption keys as potentially being lost. The warning message depicted in FIG. 4 is non-limiting and any useful warning message may be provided.

Returning to FIG. 3, in some examples, method 300 may include receiving, from graphical user interfaces depicted on display devices, inputs indicating user requests to send, from the client computing devices and to the servers, the recovery requests.

In some embodiments, in response to the recovery requests, crowd worker computing devices may request users to sign into the crowd worker computing devices to enable recovery processes from by the crowd worker computing devices. In an example, users may be incentivized to sign into the crowd worker computing devices with monetary bonuses paid by the users of the client computing devices.

As illustrated in FIG. 3, at step 304 one or more of the systems described herein may create first public-private key pairs. The systems described herein may perform step 304 in a variety of ways. For example, creating module 106 may, as part of computing device 202, server 206, and/or at least one of crowd worker computing devices 208A-208N in FIG. 2, create first public-private key pair 122.

In some examples, method 300 may include generating, at the client computing devices, keychains having authentication credentials. In an example, the authentication credentials may include at least one of a passphrase, a token, and biometric data. In an embodiment, method 300 may include deriving, at the client computing devices, the first public-private key pairs from the authentication credentials. In some embodiments, method 300 may further include sending the keychains to the servers for storage at the servers. In some embodiments, method 300 may further include requesting the servers send the keychains to the client computing devices and/or receiving the keychains from the servers.

In some embodiments, method 300 may include transferring, via the servers and between the client computing devices and the crowd worker computing devices, the first public keys of the first public-private key pairs and the public keys of crowd worker computing devices.

In some embodiments, method 300 may include causing, in response to receiving the recovery request, the servers to wait until "k" crowd worker computing devices are logged-in, where "k" may be a total number of different shares into which the encryption keys are divided.

In some embodiments, method 300 may include receiving, at crowd worker computing devices, encrypted shares of the encryption keys. In some embodiments, method 300 may include decrypting, at the crowd worker computing devices, the encrypted shares of the encryption keys with crowd worker private keys. In some examples, method 300 may include re-encrypting, at the crowd worker computing devices, the decrypted shares of the encryption keys with the first public keys of the first public-private key pairs. In some embodiments, method 300 may include sending, from the crowd worker computing devices to the servers, the re-encrypted shares of the encryption keys.

In some examples, method 300 may include causing the servers to send, after "k" crowd worker computing devices are logged-in, the plurality of encrypted shares of the encryption keys from the servers to the client computing devices.

As illustrated in FIG. 3, at step 306 one or more of the systems described herein may receive pluralities of encrypted shares of encryption keys from the servers in response to the recovery requests. In some examples, the encrypted shares may be encrypted with first public keys of the first public-private key pairs. The systems described herein may perform step 306 in a variety of ways. For example, receiving module 108 may, as part of computing device 202, server 206, and/or at least one of crowd worker computing devices 208A-208N in FIG. 2, receive a plurality of encrypted shares of an encryption key 123 from server 206 in response to recovery request 121, where the encrypted shares of the encryption key 123 may be encrypted with first public key 125 of first public-private key pair 122.

In some examples, method 300 may include receiving, at the client computing devices and from the servers, messages indicting the servers have accumulated enough of the encrypted shares of encryption keys to recover the encryption keys.

As illustrated in FIG. 3, at step 308 one or more of the systems described herein may perform security actions (e.g., including steps 310 and/or 312). The systems described herein may perform step 308 in a variety of ways. For example, performing module 110 may, as part of computing device 202, server 206, and/or at least one of crowd worker computing devices 208A-208N in FIG. 2, perform security action 126.

In examples, security actions may include measures taken to safeguard electronic information. Measures may include acts undertaken to prevent, detect, and/or mitigate vulnerabilities of electronic computing devices, to implement computer security policies (e.g., enable recovering keys), to detect malicious activities on electronic computing devices, and/or to thwart malicious activities on electronic computing devices.

In some examples, method 300 may further include performing at least one security action in response to losing access to keys, detecting vulnerabilities of electronic computing devices, detecting potential security risks directed toward the electronic computing devices, detecting malicious activity directed toward the electronic computing devices, or a combination thereof. In some examples, security actions may be performed in an attempt to ameliorate potential security risks. For example, performing modules may identify potential security risks and in response performing modules may perform security actions in attempts to ameliorate the potential security risks. Security actions may include pausing and/or stopping acts by users and/or autonomous processes executing on computers.

Security actions may also include notifying users of potential security risks (e.g., via graphical user interfaces depicted on displays). In some examples, security actions may include preventing data entry into user interfaces and/or displaying warnings on user displays. In additional examples, the security actions may include displaying, on user displays, warnings indicating a status of security.

As illustrated in FIG. 3, at step 310 one or more of the systems described herein may decrypt the pluralities of encrypted shares of the encryption keys with first private keys of the first public-private key pairs. The systems described herein may perform step 310 in a variety of ways. For example, decrypting module 112 may, as part of computing device 202, server 206, and/or at least one of crowd worker computing devices 208A-208N in FIG. 2, decrypt the plurality of encrypted shares of the encryption key 123 with first private key 127 of first public-private key pair 122.

As illustrated in FIG. 3, at step 312 one or more of the systems described herein may recover the encryption keys from the decrypted pluralities of shares of the encryption keys. The systems described herein may perform step 312 in a variety of ways. For example, recovering module 114 may, as part of computing device 202, server 206, and/or at least one of crowd worker computing devices 208A-208N in FIG. 2, recover encryption key 124 from decrypted plurality of shares of the encryption key 128.

In some examples, the method may include storing the recovered encryption keys on keychains at the client computing devices.

The computing devices described herein may create encryption keys and/or disseminate encrypted shares of the encryption keys using the following techniques.

In some embodiments, method 300 may include creating, at client computing devices, second keychains. In some examples, method 300 may include creating second public-private key pairs including second public keys. In some embodiments, method 300 may include locking the second keychains with the second public-private key pairs.

In some examples, method 300 may include storing the first private keys of the first public-private key pairs and the second private keys of the second public-private key pairs on digital information storage devices in a manner such that the servers may be unable to access the first private keys of the first public-private key pairs and the second private keys of the second public-private key pairs.

In some examples, when cloud storage is initially set up, crowd worker computing devices may be selected. Probabilistic methods may be employed to ensure high odds of recovery when selecting crowd worker computing devices, as some crowd worker computing devices may not be frequently available. Some factors that may be considered when selection crowd worker computing devices may include (i) frequency of resetting candidate crowd worker computing devices, (ii) number of credentials (e.g., passwords, VIP tokens, biometrics, etc.) used on the candidate crowd worker computing devices, (iii) specific authentic credentials (e.g., government issued electronic drivers licenses) used by users of the candidate crowd worker computing devices, (iv) frequency of sign-in by users of the candidate crowd worker computing devices, (v) ownership of certain products such as anti-malware software by users of the candidate crowd worker computing devices, (vi) rapidity of sign-in, after computing sessions end, by users of the candidate crowd worker computing devices (vi) number of secrets held by users of the candidate crowd worker computing devices, and/or (vii) weighing of at least some of the above factors. In some embodiments, machine learning techniques may be applied to identify crowd worker computing devices that may be best candidates. In some embodiments, characteristics of users of the crowd worker computing devices may be taken into account. These characteristics may include user age, gender, education, location, user device characteristic, the like, and/or combinations thereof.

In some embodiments, method 300 may include selecting "N" crowd worker computing devices based on crowd worker computing device authentication profiles. In some examples, the authentication profiles may include per-crowd worker computing device factors including at least one of (i) a frequency of credential reset on the crowd worker computing device, (ii) a number of credentials stored on the crowd worker computing device, (iii) an identity of specific credentials stored on the crowd worker computing device, (iv) a frequency of a user logging-in to the crowd worker computing device, (v) a number of security-related applications installed on the crowd worker computing device, (vi) a rate of a user logging-in by the crowd worker computing device, and/or (vii) a quantity of sensitive information stored on the crowd worker computing device.

In some examples, method 300 may include transferring, via the servers and between the client computing devices and the crowd worker computing devices, the second public keys of the second public-private key pairs and the public keys of crowd worker computing devices. In some examples, the method may include receiving public keys of crowd worker computing devices for at least "N" crowd worker computing devices.

In some embodiments, method 300 may include performing a "secret sharing scheme" cryptography technique to divide the encryption keys and create the pluralities of shares. In some examples, method 300 may implement "Shamir's secret sharing scheme" as the "secret sharing scheme" cryptography technique. In some examples, there may be "N" shares in the pluralities of shares. In some embodiments, method 300 may include encrypting the pluralities of shares of the encryption keys with public keys of the crowd worker computing devices. In some embodiments, method 300 may include copying individual shares multiple times. In some examples, each copy may be encrypted with a different public key from public-private key pairs of the crowd worker computing devices. The number of shares may be less than the number of crowd worker computing devices calculated to be available for subsequent key recovery. In some examples, method 300 may include sending the pluralities of encrypted shares of the encryption keys to the servers. In some embodiments, method 300 may include receiving, at the servers, the pluralities of encrypted shares of the encryption keys. At this point, only the crowd worker computing devices hold respective private keys that may decrypt the encrypted shares of the encryption keys, which may advantageously protect against malicious acts by dishonest server providers and/or protect against malicious acts targeting servers. In some examples, crowd randomness may be verified by requesting more keys than a cloud provider may physically obtain and selecting keys at random, analyzing public attributes of keys (e.g., state and country of issue, time if issue, source of issue, etc.), and verifying the keys are randomly distributed.

In some examples, method 300 may include storing, on digital information storage devices at the servers, the pluralities of encrypted shares of the encryption keys and identifiers of crowd worker computing devices associated with each share of the pluralities of encrypted shares of the encryption keys.

As detailed herein, the steps outlined in method 300 in FIG. 3 and the systems of FIGS. 1-2 and 4 may enable computing devices to automatically perform methods for crowd-storing encryption keys. By doing so, the systems and methods described herein may improve the security of computing devices and/or provide targeted protection against lost encryption keys, malware that affects (e.g., alters and/or deletes) encryption keys, and/or malicious users. In some examples, the systems and methods described herein may advantageously help users recover lost encryption keys.

Figure 5:
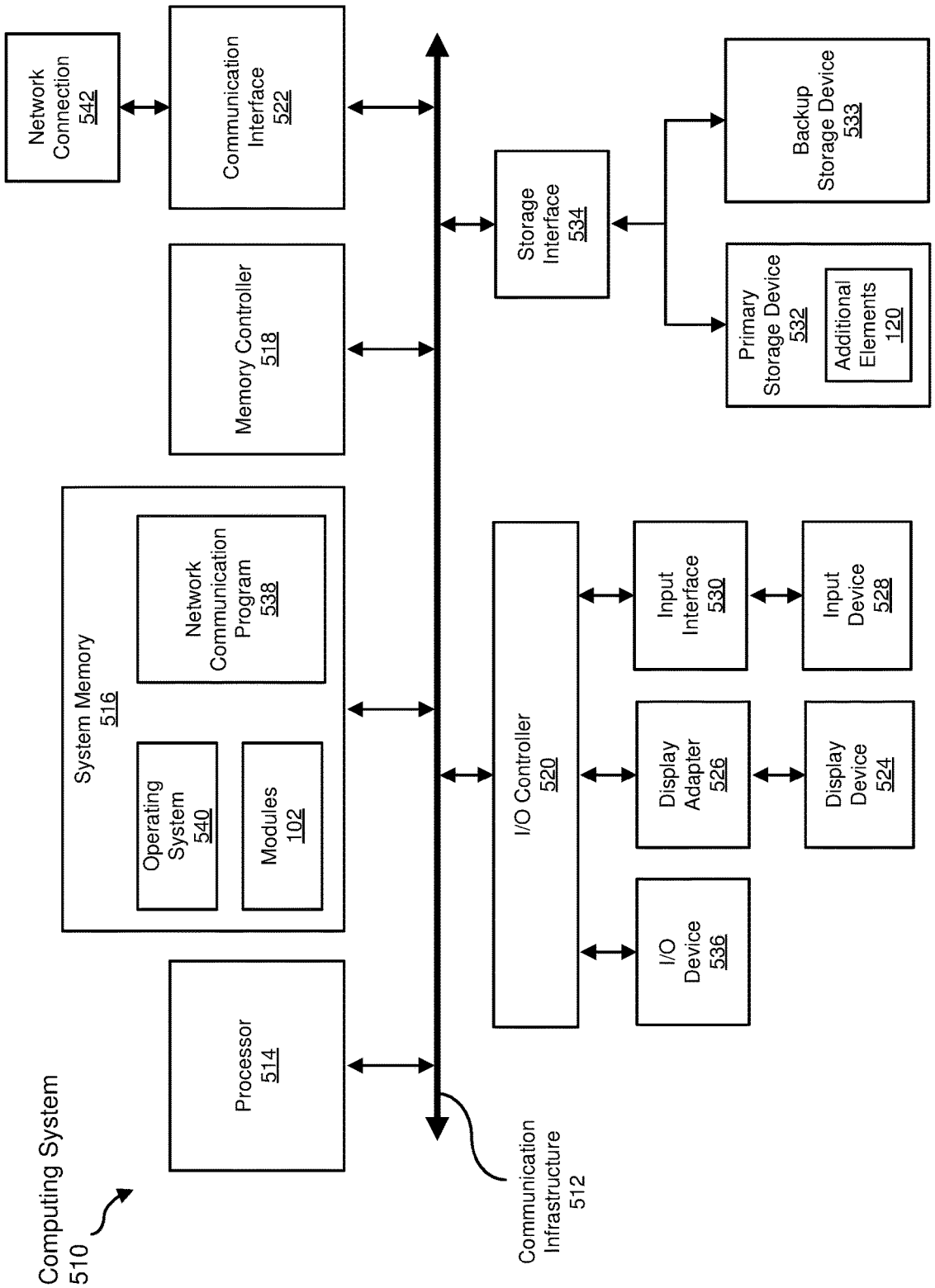
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. 0

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and

533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
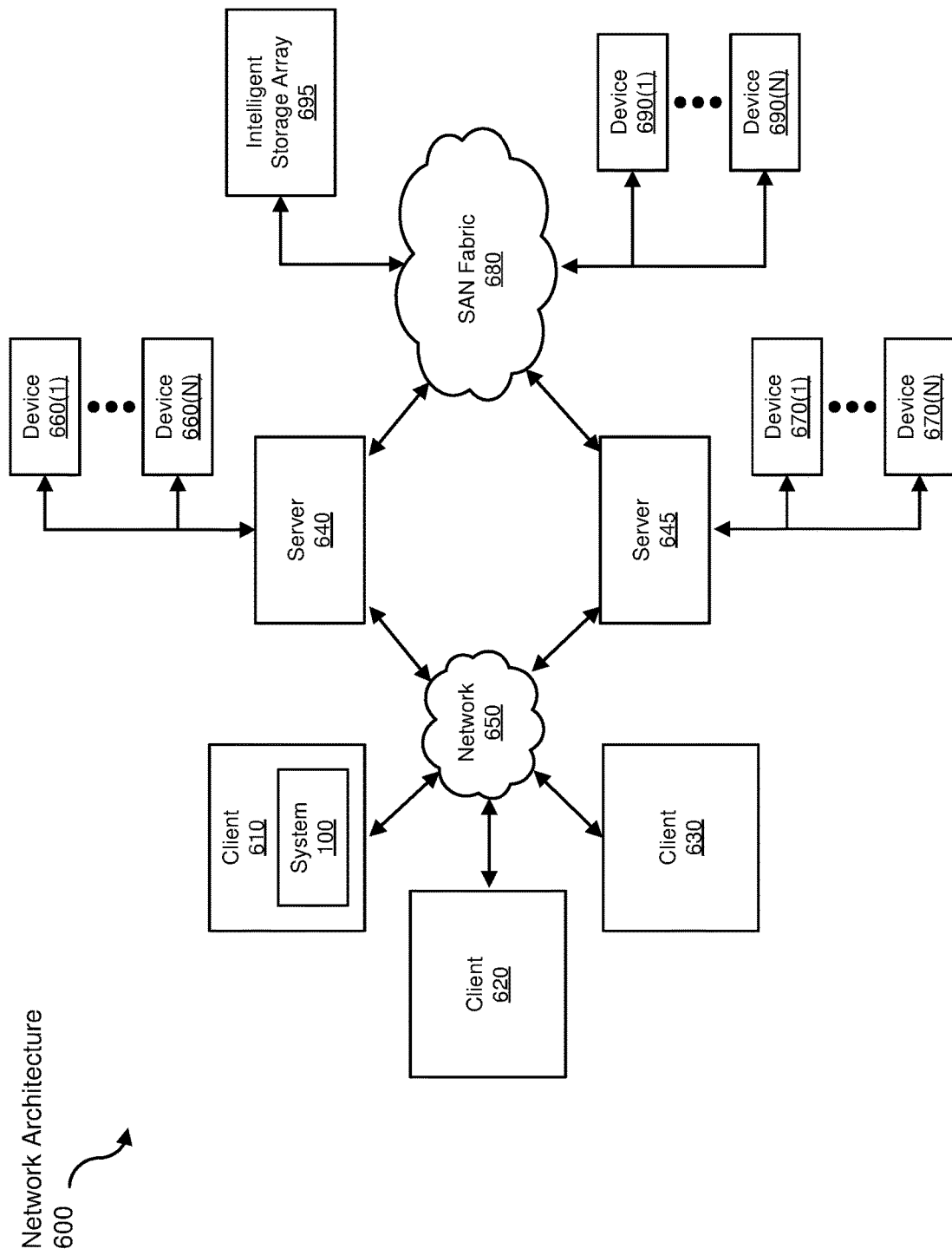
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for crowd-storing encryption keys.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a plurality of encrypted shares of an encryption key to be transformed, transform the plurality of encrypted shares of the encryption key, output a result of the transformation to a digital information storage device, use the result of the transformation to decrypt stored digital information, and store the result of the transformation to a digital information storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for crowd-storing encryption keys, at least a portion of the method being performed by a client computing device comprising at least one processor, the method comprising:
   encrypting each share of an encryption key with a public key of a respective crowd worker computing device, wherein the encrypting comprises encrypting multiple copies of a share, each copy of the share being encrypted with a different public key of a different respective crowd worker computing device;
   sending, to a server, each encrypted share of the encryption key for storage on the server along with identity information associated with the respective crowd worker computing device;
   creating a first public-private key pair;
   sending, to the server, a request to recover the encryption key along with the first public key of the first public-private key pair;
   receiving, from the server, re-encrypted shares of the encryption key in response to the recovery request and subsequent to the server waiting for each respective crowd worker computing device to log in to the server, wherein the re-encrypted shares comprise each of the shares of the encryption key decrypted by the respective crowd worker computing device and re-encrypted with the first public key of the first public-private key pair; and
   performing a security action to recover the encryption key comprising decrypting each of the re-encrypted shares of the encryption key with the first private key of the first public-private key pair.

2. The method of claim 1, further comprising generating a keychain having authentication credentials.

3. The method of claim 2, wherein sending the request to recover the encryption key along with the first public key of the first public-private key pair comprises sending the keychain to the server for storage at the server.

4. The method of claim 2, further comprising deriving the first public-private key pair from the authentication credentials.

5. The method of claim 4, further comprising storing the recovered encryption key on the keychain at the client computing device.

6. The method of claim 1, wherein re-encrypting each share of the encryption key with the first public key of the first public-private key pair comprises, for each respective crowd worker computing device:
   receiving an encrypted share of the encryption key;
   decrypting the encrypted share of the encryption key with a crowd worker private key; and
   re-encrypting the decrypted share of the encryption key with the first public key of the first public-private key pair.

7. The method of claim 1, further comprising receiving public keys for a number of crowd worker computing devices comprising each of the respective crowd worker computing devices; and
   wherein encrypting each share of the encryption key with the public key of the respective crowd worker computing device comprises dividing the encryption key into a number of shares less than or equal to the number of crowd worker computing devices.

8. The method of claim 7, wherein the number of crowd worker computing devices is based on crowd worker computing device authentication profiles.

9. The method of claim 8, wherein the authentication profiles comprise per-crowd worker computing device factors comprising at least one of:
   a frequency of credential reset on the crowd worker computing device;
   a number of credentials stored on the crowd worker computing device;
   an identity of specific credentials stored on the crowd worker computing device;
   a frequency of a user logging-in to the crowd worker computing device;
   a number of security-related applications installed on the crowd worker computing device;
   a rate of a user logging-in by the crowd worker computing device; and a quantity of sensitive information stored on the crowd worker computing device.

10. The method of claim 7, further comprising storing the first private key of the first public-private key pair on a digital information storage device in a manner such that the server is unable to access the first private key of the first public-private key pair.

11. The method of claim 1, further comprising receiving, by the client computing device and from a graphical user interface depicted on a display device of the client computing device, input indicating a user request to send the request to recover the encryption key.

12. A system for crowd-sourcing encryption keys, the system comprising:
at least one physical processor; and
physical memory comprising computer-executable instructions that, when executed by the at least one physical processor, cause the at least one physical processor to:
encrypt each share of an encryption key with a public key of a respective crowd worker computing device,
wherein the encrypting comprises encrypting multiple copies of a share, each copy of the share being encrypted with a different public key of a different respective crowd worker computing device;
send each encrypted share of the encryption key for storage on a server along with identity information associated with the respective crowd worker computing device;
create a first public-private key pair;
send a request to recover the encryption key from the server along with the first public key of the first public-private key pair;
receive re-encrypted shares of the encryption key from the server in response to the recovery request and subsequent to the server waiting for each respective crowd worker computing device to log in to the server, wherein the re-encrypted shares comprise each of the shares of the encryption key decrypted by the respective crowd worker computing device and re-encrypted with the first public key of the first public-private key pair; and
perform a security action to recover the encryption key comprising decrypting each of the re-encrypted shares of the encryption key with the first private key of the first public-private key pair.

13. The system of claim 12, further comprising computer-executable instructions that, when executed by the physical processor, cause the physical processor to:
create authentication credentials;
derive the first public-private key pair from the authentication credentials; and
store the recovered encryption key on a keychain.

14. The system of claim 12, further comprising computer-executable instructions that, when executed by the physical processor, cause the physical processor to receive input indicating a request to send the recovery request.

15. A non-transitory computer-readable medium comprising one or more computer-executable instructions that, when executed by at least one processor of a client computing device, cause the client computing device to:
encrypt each share of an encryption key with a public key of a respective crowd worker computing device,
wherein the encrypting comprises encrypting multiple copies of a share, each copy of the share being encrypted with a different public key of a different respective crowd worker computing device;
send, to a server, each encrypted share of the encryption key for storage on the server along with identity information associated with the respective crowd worker computing device;
create a first public-private key pair;
send, to the server, a request to recover the encryption key from the server along with the first public key of the first public-private key pair;
receive, from the server, re-encrypted shares of the encryption key in response to the recovery request and subsequent to the server waiting for each respective crowd worker computing device to log in to the server, wherein the re-encrypted shares comprise each of the shares of the encryption key decrypted by the respective crowd worker computing device and re-encrypted with the first public key of the first public-private key pair; and
perform a security action to recover the encryption key comprising decrypting each of the re-encrypted shares of the encryption key with the first private key of the first public-private key pair.

16. The non-transitory computer-readable medium of claim 15, further comprising one or more computer-executable instructions that, when executed by at least one processor of a computing device, cause the computing device to:
create authentication credentials;
derive the first public-private key pair from the authentication credentials; and
store the recovered encryption key on a keychain.

17. The non-transitory computer-readable medium of claim 15, further comprising one or more computer-executable instructions that, when executed by at least one processor of a computing device, cause the computing device to receive input indicating a request to send the recovery request.

18. The method of claim 2, wherein generating the keychain having authentication credentials comprises generating a new keychain having new authentication credentials, wherein the new keychain is locked using a new passphrase that is different from a previous passphrase used to lock a previous keychain having previous authentication credentials.

19. The method of claim 18, wherein creating the first public-private key pair comprises deriving the first public-private key pair from the new authentication credentials.

* * * * *

UNITED STATES PATENT AND TRADEMARK OFFICE
CERTIFICATE OF CORRECTION

PATENT NO. : 11,184,169 B1
APPLICATION NO. : 16/231887
DATED : November 23, 2021
INVENTOR(S) : Sokolov et al.

Page 1 of 1

It is certified that error appears in the above-identified patent and that said Letters Patent is hereby corrected as shown below:

On the Title Page

In Item (54) Title, and in the Specification in Column 1, Line 2 delete "Encrypiion" and insert -- Encryption --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*